US012769118B2

(12) United States Patent
Philipp et al.

(10) Patent No.: US 12,769,118 B2
(45) Date of Patent: Oct. 20, 2026

(54) TELECENTRIC VIRTUAL IMAGE PROJECTION SYSTEM

(71) Applicant: GM GLOBAL TECHNOLOGY OPERATIONS LLC, Detroit, MI (US)

(72) Inventors: Tzvi Philipp, Bet Shemesh (IL); Thomas A. Seder, Fraser, MI (US); Manoj Kumar Sharma, Troy, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 18/425,455

(22) Filed: Jan. 29, 2024

(65) Prior Publication Data

US 2025/0244575 A1 Jul. 31, 2025

(51) Int. Cl.
*G02B 27/01* (2006.01)

(52) U.S. Cl.
CPC ...... *G02B 27/0101* (2013.01); *G02B 27/0179* (2013.01); *G02B 2027/0187* (2013.01)

(58) Field of Classification Search
CPC ............ G02B 27/0101; G02B 27/0093; G02B 2027/0185
See application file for complete search history.

(56) References Cited

U.S. PATENT DOCUMENTS

| | | | | |
|---|---|---|---|---|
| 2015/0277129 | A1* | 10/2015 | Hua | G02B 27/106 359/462 |
| 2017/0261729 | A1 | 9/2017 | Powell | |
| 2017/0261748 | A1* | 9/2017 | Powell | G02B 27/283 |
| 2021/0364817 | A1* | 11/2021 | Bhagavatula | G06F 3/147 |
| 2023/0266596 | A1* | 8/2023 | Schuck | G02B 5/3083 345/8 |
| 2023/0393400 | A1* | 12/2023 | El-Haddad | G02B 27/283 |

OTHER PUBLICATIONS

Office Action issued Jul. 24, 2024 in German Application No. 10 2024 107 409.4; 5pgs.

* cited by examiner

*Primary Examiner* — William R Alexander
*Assistant Examiner* — Mackenzi Bourquine

(57) ABSTRACT

A virtual imaging system includes: a projection display configured to display at least one object; a Fourier transform element comprising at least one telecentric lens and configured to Fourier transform the at least one object to generate at least one converted object, the at least one converted object being reverse Fourier transform converted by lenses of eyes of a viewer to a virtual image seen by retinas of the viewer; and a control module configured to control operation of the projection display to display the at least one object and, via the Fourier transform element, project the virtual image seen by the viewer.

20 Claims, 8 Drawing Sheets

TELECENTRIC VIRTUAL IMAGE PROJECTION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to virtual image displays.

Display devices are used in a variety of applications. Some example display devices are flat panel displays, projection displays, and head-up displays. Display devices can be either be of a transmission or reflection type.

An occupant (e.g., driver or passenger) of a vehicle traditionally views surroundings of a vehicle through windows of the vehicle. A driver may control vehicle acceleration, deceleration, and steering based on the driver's visual observation of the surroundings of the vehicle. A passenger may be forward or rearward facing and observe surroundings through front, side or rear windows of the vehicle. The vehicle may include one or more displays that display various information to the occupant. For example, some vehicles include an infotainment system that includes a display that displays various infotainment and other vehicle information. The vehicle may include a head-up display (HUD) that displays information by forming a virtual image at a certain distance with reflection of a windshield. For example, the HUD may display a vehicle speed and other vehicle information (e.g., warnings such as lane departure warnings and collision avoidance warnings).

SUMMARY

A virtual imaging system is disclosed and includes: a projection display configured to display at least one object; a Fourier transform element including at least one telecentric lens and configured to Fourier transform the at least one object to generate at least one converted object, the at least one converted object being reverse Fourier transform converted by lenses of eyes of a viewer to a virtual image seen by retinas of the viewer; and a control module configured to control operation of the projection display to display the at least one object and, via the Fourier transform element, project the virtual image seen by the viewer.

In other features, the Fourier transform element is located a focal length of the at least one telecentric lens from the projection display.

In other features, the virtual imaging system further includes a position shifting system configured to move the projection display relative to the Fourier transform element. The control module is configured to control the position shifting system to adjust a distance between the projection display and the Fourier transform element.

In other features, the virtual imaging system further includes a position shifting system configured to move the Fourier transform element relative to the projection display. The control module is configured to control the position shifting system to adjust a distance between the projection display and the Fourier transform element.

In other features, the Fourier transform element is i) at a first location, which is a focal length $f_L$ of the Fourier transform element from the eyes of the viewer, ii) at a second location, which is a sum of the focal length $f_L$ of the Fourier transform element and a focal length $f_e$ of the eyes of the viewer away from the eyes of the viewer, or iii) at a third location, which is between the first location and the second location.

In other features, the virtual imaging system further includes a reflector disposed between the Fourier transform element and the viewer, where the reflector is semi-transmissive and semi-reflective.

In other features, the virtual imaging system further includes a position shifting system configured to move the Fourier transform element relative to the reflector. The control module is configured to control the position shifting system to adjust a distance between the Fourier transform element and the reflector.

In other features, the Fourier transform element consists of the at least one telecentric lens. No intermediary devices are disposed between the projection display and the at least one telecentric lens. No intermediary devices are disposed between the Fourier transform element and the reflector.

In other features, the Fourier transform element includes a focus tunable lens. The control module is configured to control a voltage applied to the focus tunable lens to adjust a focal length of the focus tunable lens.

In other features, the virtual imaging system further includes at least one position shifting system coupled to and configured to move at least one of the projection display and the Fourier transform element. The control module is configured to adjust an apparent location of the virtual image and distance of the virtual image from the viewer by varying a distance of the at least one object from the at least one telecentric lens via the position shifting system.

In other features, the virtual imaging system further includes at least one eye tracking device configured to track the eyes of the viewer. The control module is configured to determine a head pose and gaze angles of the eyes of the viewer based on an output of the at least one eye tracking device, and, based on the head pose and the gaze angles, to display a first selected one or more objects in a first region of the projection display to be viewed by a left eye of the viewer, and to display a second selected one or more objects in a second region of the projection display to be viewed by a right eye of the viewer.

In other features, the control module is configured to convert the head pose and the gaze angles of the eyes to position coordinate locations on the projection display.

In other features, the control module is configured to display different object data in a first region of the projection display than in a second region of the projection display.

In other features, the virtual imaging system further includes at least one eye tracking device configured to track the eyes of the viewer. The control module is configured to determine a head pose and gaze angles of the eyes of the viewer based on an output of the at least one eye tracking device, and, based on the head pose and the gaze angles, to display a first portion of a selected object via a first region of the projection display and a second portion of the selected object via a second region of the projection display to display a virtual three-dimensional image.

In other features, the projection display includes an array of light emitting devices and is configured to produce a collimated light beam directed at the Fourier transform element.

In other features, the projection display, the Fourier transform element and the control module provide uniform magnification across the virtual image.

In other features, a virtual image projection method is disclosed and includes: displaying at least one object via a projection display; Fourier transforming the at least one object via at least one telecentric lens disposed downstream from the projection display to generate at least one converted object, where the at least one converted object is reverse Fourier transform converted by lenses of eyes of a viewer to a virtual image seen by retinas of the viewer; and controlling operation of the projection display to display the at least one object and, via the Fourier transform element, project the virtual image seen by the viewer.

In other features, the virtual image projection method further includes: disposing a reflector between the Fourier transform element and the viewer, where the reflector is semi-transmissive and semi-reflective; moving the Fourier transform element relative to the reflector via a position shifting system; and controlling the position shifting system to adjust a distance between the Fourier transform element and the reflector.

In other features, the virtual image projection method further includes: controlling a voltage applied to a focus tunable lens of the Fourier transform element to adjust a focal length of the focus tunable lens; and moving at least one of the projection display and the Fourier transform element to adjust a distance between the projection display and the Fourier transform element.

In other features, the virtual image projection method further includes: tracking eyes of the viewer to determine a head pose and gaze angles of the eyes of the viewer; converting the head pose and the gaze angles of the eyes to position coordinate locations on the projection display; and based on the position coordinate locations, displaying a first selected one or more objects in a first region of the projection display to be viewed by a left eye of the viewer, and displaying a second selected one or more objects in a second region of the projection display to be viewed by a right eye of the viewer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
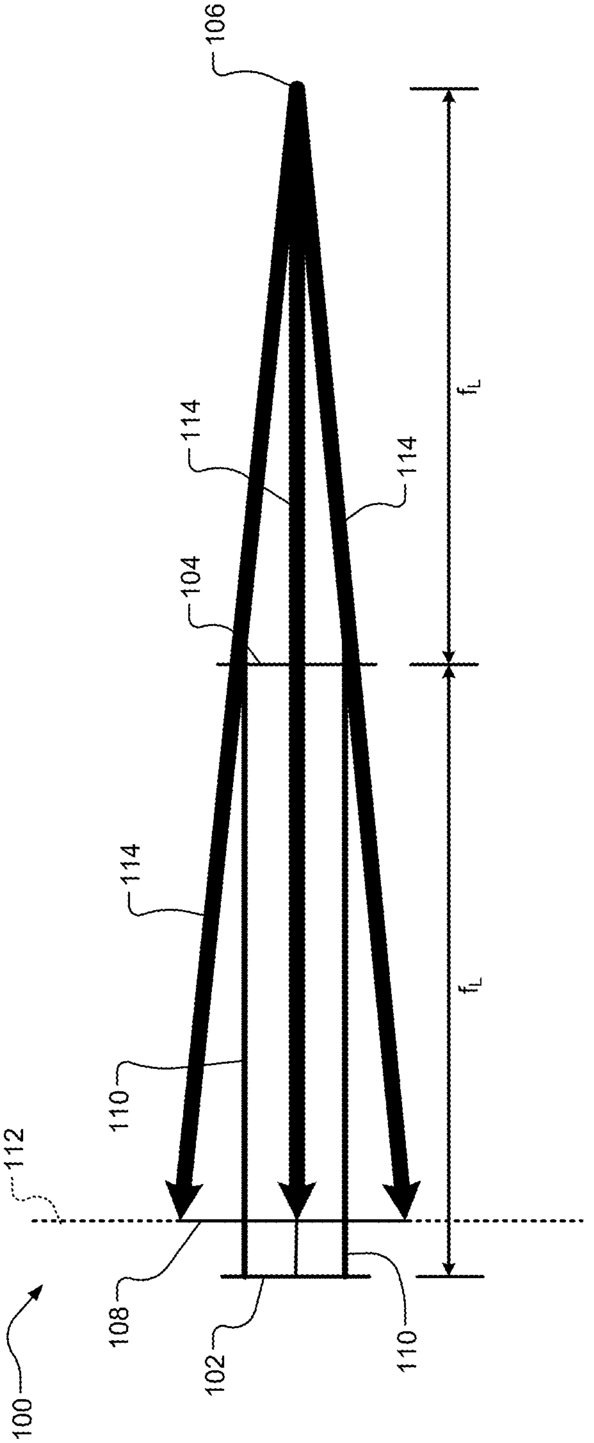
FIG. 1 is an example linear physical representative view of a virtual display system having a telecentric arrangement in accordance with the present disclosure.

In a variety of virtual image display implementations, a virtual image is not immediately in front of an observer (or viewer), but rather is projected forward of the observer. By shifting an apparent location of an image to be away from the viewer, there is potentially a larger interaction volume between the image and the viewer for the observer to make gestures and interact with the corresponding imaging and/or entertainment system. In addition, the increased observation distance associated with projecting the image away from the viewer can provide improved privacy in the content being viewed. This is because the actual viewing region of the projected image is narrower than the viewing region of a virtual image that is displayed closer to the viewer.

Technologies exist for displaying a virtual 3D image. These technologies however include computationally heavy image processing that is implemented to convert an object image into an associated Fourier transformation of that object. The Fourier transform of the object is able to be projected by a projection system to the eyes of a viewer and thus the corresponding image information is provided to retinas of the eyes. The eyes perform a reverse transform including converting the projected transformed object data back into an image as seen by the viewer.

The examples set forth herein include virtual imaging systems including one or more telecentric optical lenses (referred to herein as the “lens” or “lenses”). The one or more lenses perform as a Fourier transform element, which may be located a focal length $f_L$ from a projector to perform a Fourier transform. The focal length $f_L$ is a focal length of the Fourier transform element. The Fourier transform element receives a light beam (or light rays) out of the projector and performs a Fourier transform.

This stated transformation is done via the Fourier transform element instead of converting the image projected from the projector computationally using, for example, a spatial light modulator (SLM) and a controller. The disclosed architectures of the virtual imaging systems are provided as alternatives to a traditional approach that is relatively computationally heavy and includes the use of the SLM and the controller. In a traditional SLM system, a laser source generates a light beam that is directed at a dynamic two-dimensional (2D) SLM. An image is generated by creating a 2D fast Fourier transform (FFT) of a desired image, which is then encoded onto the dynamic 2D SLM. The SLM is illuminated by the laser light, red-green-blue simultaneously or sequentially. The SLM has a reflective design such that only the pixels with the desired pattern steer the light, which is then projected to a viewer via projection optics. The projection optics do not include a telecentric lens. The projected beam is then collected and imaged by the viewer's eyes forming an image on the retinas of the viewer. This approach has a drawback of being computationally challenging including requiring the calculation of a 2D FFT of the desired image at a desired frame rate (e.g., approximately 60 frames per second (fps) or higher if operating in a color sequential mode. This can be challenging for SLM operation. It is also computationally extensive to perform these operations for each 2D FFT frame. The examples disclosed herein avoid the heavy image processing of a tradition system by creating real images that are transformed optically into 2D FFT objects due to relative telecentric lens placements without need of computational overhead traditionally associated with performing the Fourier transform.

Some example embodiments include an autostereoscopic virtual display architecture that enables a projection method for generating a virtual image via observation through an optical element (e.g., one or more telecentric lenses) not proximally located in front of the observer. The telecentric or near telecentric design enables low distortion image viewing. The image magnification remains uniform over the virtual image. Different regions of a display are mapped to different angular respective inputs of eyes of a viewer. This is accomplished by tracking the viewer's eyes including tracking different instantaneous angular eye positions and translating the angular eye positions to different pixel locations on the display. By displaying separate content for and to each eye of the viewer, a three-dimensional (3D) effect is generated. The translation of a displayed object on the display (or object screen) is controlled by input from an eye tracking device (e.g., one or more cameras).

The examples disclosed herein provide a simplified design having less costs than a traditional system. The example virtual imaging systems have reduced computational complexity by performing a Fourier transform using a telecentric lens instead of other computationally involved arrangements. The examples provide an autostereoscopic display method using a single object source screen and provide improved image magnification uniformity. The examples i) provide a brighter image, assuming a near collimated display source, ii) allow for an increased apparent virtual image distance of a projected virtual image from a viewer, and iii) a large virtual image size. The disclosed systems are absent a spatial light modulator.

A "telecentric lens" as referred to herein may include one or more lenses that assure that each ray of light from respective points in an object plane (or displayed) intersect at a pupil plane (or eye focal plane). A telecentric lens has its entrance or exit pupil, or both, at infinity. The size of images produced by a telecentric lens is insensitive to either i) a distance between an object being imaged and the lens, or ii) a distance between an image plane and the telecentric lens, or both. The systems disclosed herein provide bi-telecentric systems where two lenses of each of the systems are telecentric. This includes the telecentric lenses located between projection displays of the systems and viewers, and lenses respectively of the eyes of the viewer, which are also telecentric lenses.

FIG. 1 shows a linear physical representative view of a virtual display system 100 having a telecentric arrangement. The virtual display system 100 includes a projection display 102 and one or more telecentric lenses 104 that project an image to a retina (represented by point 106) of an eye of a viewer. The viewer sees a virtual image at a virtual image location, represented by line 108. The one or more lenses 104 (referred to as the telecentric lens 104) are positioned a focal length $f_L$ from the projection display (or display screen) 102. A pupil of the viewer's eye may be 7 mm in diameter and determines an instantaneous field-of-view (FOV). The projection display 102, which may be configured as any of the displays referred to herein, displays an object, which is projected through the telecentric lens 104 towards the eye. Light rays 110 are emitted from the display 102 and pass through the telecentric lens 104. The telecentric lens 104 performs a Fourier transform to generate a transformed object, which is reverse Fourier transformed by the eye to an image seen by the viewer. The viewer perceives the image as being projected in a virtual image plane 112. Lines 114 represent rays of the virtual projection seen by the viewer.

Figure 2:
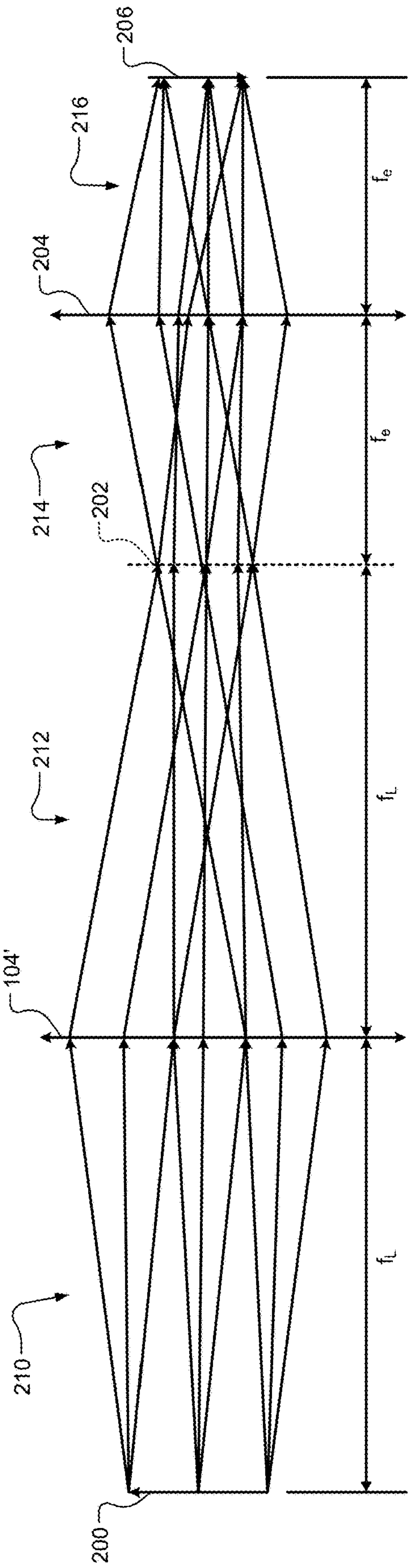
FIG. 2 is another example linear physical representative view of the telecentric arrangement of FIG. 1 illustrating focal lengths of a telecentric lens and a focal length of an eye and paths of light rays between an object and a retina of the eye.

FIG. 2 shows another linear physical representative view of the telecentric arrangement of FIG. 1. An object being displayed is represented by arrow 200. The telecentric lens (represented by arrow 104') is the focal length $f_L$ from the object 200. A Fourier transform plane 202 is located the focal length $f_L$ from the telecentric lens 104'. A Fourier transform of the object 200 exists in the Fourier transform plane 202. A lens of an eye of a viewer may be located at i) the Fourier transform plane 202, ii) a focal length $f_e$ of the eye from the Fourier transform plane 202, or iii) a location between the Fourier transform plane 202 and another plane (may be referred to as the eye focal plane) extending parallel to the Fourier transform plane 202 and located the focal length $f_e$ from the Fourier transform plane 202. The eye focal plane is represented by arrow 204. The retina of the eye is represented by arrow 206. The retina of the eye is the focal length $f_e$ from the eye focal plane 204.

An object (e.g., the object 200) placed precisely at the focal point of (or the focal length $f_L$ away from) the telecentric lens 104' provides a Fourier transform of that object at the distance $f_L$ on the alternate (or image) side of the telecentric lens 104'. A secondary lens (e.g., the lens of a viewer's eye) positioned, for example, the distance $f_e$ from a Fourier transform plane 202 of the telecentric lens 104' generates an image of the object at the distance $f_e$ from the lens of the eye. The Fourier transform plane 202 is located the distance $f_L$ from the telecentric lens 104'.

The object 200 may be displayed by a projection display and first light rays 210 may be transmitted from the projection display as shown. The light rays may be transmitted at different angles towards the telecentric lens 104'. Lights rays 212 from the telecentric lens 104' converge towards the Fourier transform plane 202 and then diverge as represented by light rays 214 towards the eye focal plane 204. In the example shown, the lens of the eye is at the eye focal plane 204 and performs a reverse Fourier transform. Light rays 216 converge from the lens of the eye toward the retina 206.

If the second lens (or lens of the eye) has, for example, a focal length $f_e$ of about 17 millimeters (mm) then an image will be formed at the retina 206 of the object 200 whose Fourier transform is formed at a distance $f_L$ from the first lens (or telecentric lens 104'). For practical applications $f_L$ is chosen to be large relative to the focal length $f_e$ of the eye. As an example, the focal length $f_L$ may be between 1000 and 2000 mm and thus may be multiple orders of magnitude greater than $f_e$. This allows for a reduction of the sensitivity of the positioning of the eye relative to the Fourier transform plane 202 because the Fourier transform plane is located 1000-2000 mm from the telecentric lens 104', which is a much larger distance than the focal length $f_e$ of the eye. The accuracy as to where the viewer needs to position his or her eyes relative to the corresponding display displaying the object isn't constrained compared to if the focal length of the telecentric lens 104' was small. The viewer may not position his or her eyes at $f_e$ and still see the virtual image displayed.

In practice, the eye may be located at or close to the Fourier transform plane 202 since at the Fourier transform plane 202 most of the projected light is captured by the eye and the subsequent image has more uniform brightness than when not near or at the Fourier transform plane 202. The observer (or viewer) may naturally position his or her eye at this point (i.e., point of Fourier transform plane 202) since the image is brightest and easier to view at this point.

Figure 4:
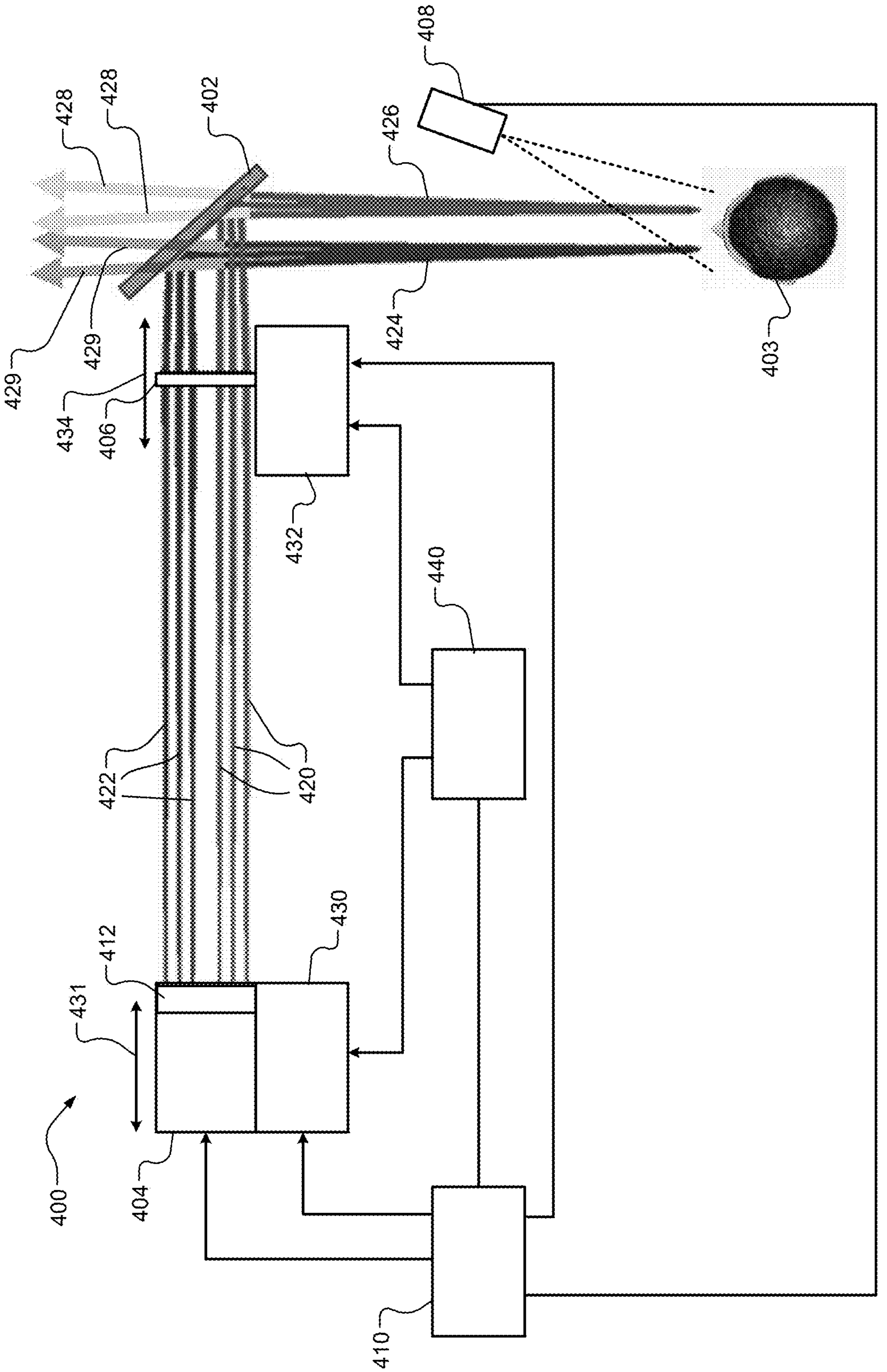
FIG. 4 is a top view of another example physical representative view of another virtual imaging system having a telecentric arrangement illustrating display of a virtual image via a reflector and in accordance with the present disclosure.
Figure 5:
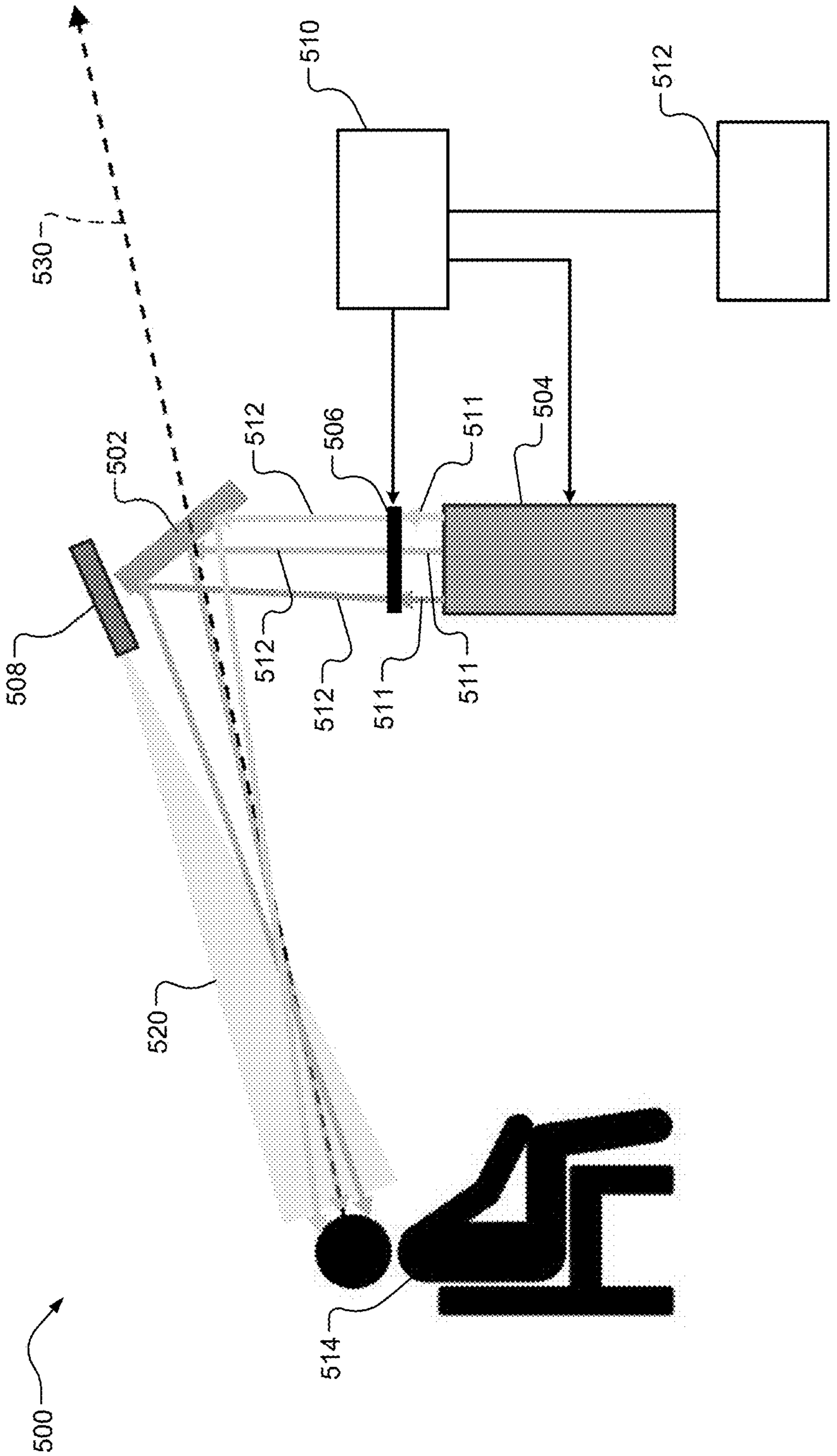
FIG. 5 is a side view of another example physical representative view of another virtual imaging system having another telecentric arrangement and including eye tracking and use of a reflector in accordance with the present disclosure.

The observer views a virtual image suspended a distance away from the observer. This distance is determined by the precision in which the telecentric lens 104' is located from the object plane (or displayed object 200) since this will determine the angular bundle of rays reaching the pupil. For an object located precisely $f_L$ from the telecentric lens 104', the virtual image will appear at infinity. For distances less than $f_L$ between the telecentric lens 104' and the object, the virtual image will appear closer than for distances longer than $f_L$. Examples are described below where the focal length of a telecentric lens is adjusted and/or the position of a telecentric lens relative to the object being displayed is adjusted. See, for example, the embodiments of FIGS. 4-5. Although certain features are shown in FIGS. 4 and 5, the features of FIGS. 4 and 5 may be implemented together as part of a same single embodiment.

Figure 3:
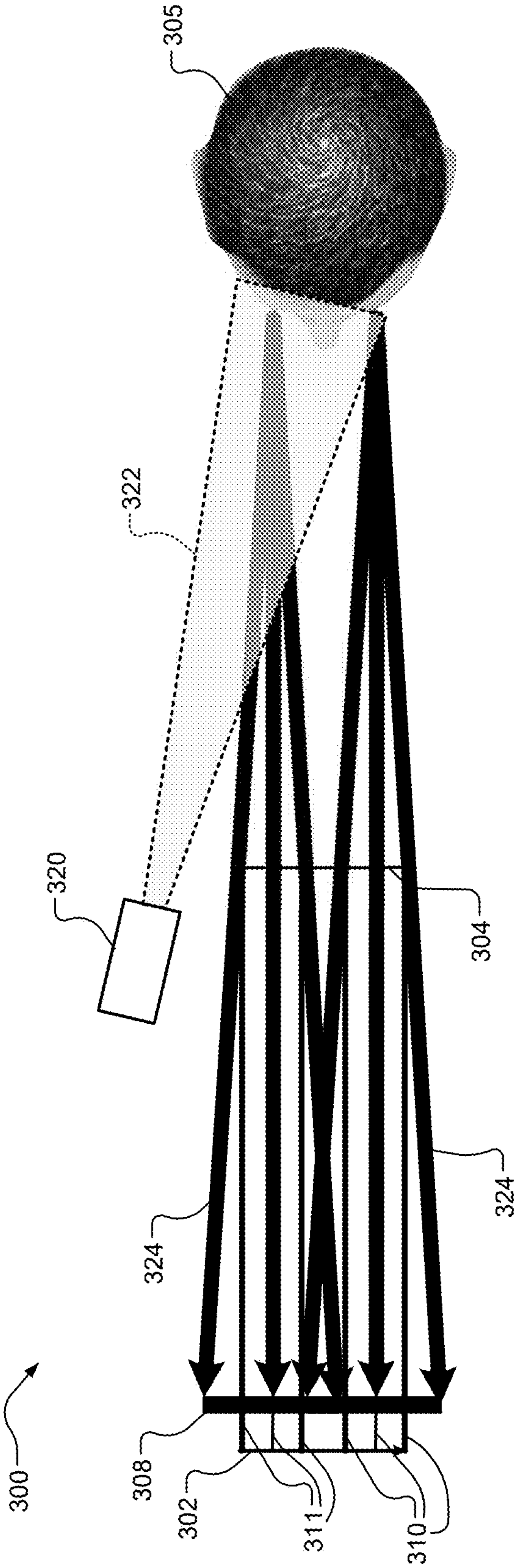
FIG. 3 is a top view of an example linear physical representative view of another virtual display system having a telecentric arrangement and implementing eye tracking to provide different object data to left and right eyes of an individual observer in accordance with the present disclosure.

FIG. 3 shows a linear physical representative view of another virtual display system 300 having another telecentric arrangement. The virtual display system 300 includes a projection display 302 and one or more telecentric lenses 304 that project images to retinas of eyes of a viewer 305. The viewer sees a virtual image at a virtual image location, represented by line 308. The one or more telecentric lenses 304 (referred to as the telecentric lens 304) are positioned a focal length $f_L$ from the projection display (or display screen) 302. The projection display 302, which may be configured as any of the displays referred to herein, displays one or more objects or multiple portions of the same object in different regions of the projection display 302. The one or more objects or portions of an object are projected through the telecentric lens 304 towards the eyes.

As an example, two different regions of the projection display 302 respectively emit light ray sets 310, 311. The light ray set 310 is projected towards the left eye of the viewer 305 and light ray set 311 is projected towards the right eye of the viewer 305. This may be done to provide a 3D effect such that the viewer is seeing a 3D virtual image.

A camera 320 is used to track i) the pose of the head of the viewer 305, referring to the X, Y, Z position of the head of the viewer 305 and the facing direction of the head of the viewer 305, and ii) the gaze angles of the eyes. The camera 320 has a field-of-view 322. Based on the head pose and the gaze angles of the eyes, it is determined where on the projection display 302 to display the objects and/or portions thereof.

The light rays of the light ray sets 310, 311 are emitted from the projection display 302 and pass through the telecentric lens 304. The telecentric lens 304 performs a Fourier transform to generate transformed objects and/or portions thereof, which are reverse Fourier transformed by the eyes to a 3D image seen by the viewer. The viewer 305 perceives the image as being projected at the virtual image location 308. Lines 324 represent rays of the virtual projection seen by the viewer 305.

In the example of FIG. 3, one display is used for both eyes of the viewer 305. The projection display 302 is subdivided into two regions. One region is mapped to the left eye and the other region is mapped to the right eye. This is illustrated by light ray sets 310, 311. The light ray set 310 provides a first image to the left eye. The light ray set 311 provides a second image to the right eye. The first image and the second image may have overlapping information. The first image and the second image may collectively display one or more objects. If a single object is displayed, the first image and the second image are different perspectives of the same object, which when displayed concurrently provide a 3D effect such that a 3D virtual image of the object is seen by the viewer.

By including one or more eye tracking devices (e.g., one or more cameras), the image generated on the display may be moved to be seen by one or both of the viewer's eyes by turning "on" or "off" the corresponding pixels on the display based on the instantaneous corresponding eye viewing angle as measured by the eye tracker device(s). A mapping function is used to translate eye gaze direction (or eye gaze angle) to a position on the display. The position may be determined using equation 1, where FOV is the field of view of the eye (e.g., 10 degrees) and $f_L$ is the focal length of the telecentric lens 304.

$$\text{Display}_{coordinates} = 2 \cdot f_1 \cdot \tan\left(\frac{FOV}{2}\right) \tag{1}$$

In this example, it is assumed that the eye in this case has a gaze angle of zero (i.e., the eye is looking straight ahead). Since the optical system is telecentric, the image magnification is uniform over the entire FOV. This is unlike conventional lenses where the magnification changes as a function of the angular field of view. The size of the projection system FOV is larger than the instantaneous FOV of the eye. This increased angular projection region ensures coverage over the "eye box" of the viewer. When the eye gaze angle is not zero, other equations may be used to determine the display coordinates (or location on the display) being viewed by the eye.

FIG. 4 shows a physical representative view of a virtual imaging system 400 having a telecentric arrangement illustrating display of a virtual image via a reflector 402. In an embodiment, the reflector 402 may be referred to as a "folding mirror" and may be implemented as a window, a windshield, or other semi-transparent (or semi-transmissive) and reflective object. This allows the viewer 403 to view through the reflector 402 concurrently i) the background (or environment) including surrounding features, and ii) projected images generated by the object display 412. In an embodiment, the reflector is implemented in a vehicle, and a viewer 403, when looking through the reflector at an environment, is able to see the virtual image in the environment.

The virtual imaging system 400 includes a projector 404, a Fourier transform element 406 that may be implemented as and/or include one or more telecentric lenses, the reflector 402, an eye tracking device 408, and a control module 410. The projector 404 may include a display 412 that displays one or more objects across a front surface of the display 412. The control module 410 controls the projector 404 to display the one or more objects and/or portions thereof in different regions on the display 412. The display 412 may include a red-green-blue (RGB) virtual cavity surface emitting laser (VCSEL) array, a light emitting diode (LED) array, or other array of light emitting devices. The display 412 includes light emitting devices that do not widely disperse light, thus the display 412 does not include cleave diodes having a wide viewing angle. The display 412 includes light emitting devices that collimate light and provide a narrow viewing angle. The light emitting device of the display 412 emits collimated light, represented as light rays 420, 422, which are directed through the Fourier transform element 406, reflected off the reflector 402 and directed to the left and right eyes of the viewer 403. The light rays directed to the left eye are designated 424 and the light rays directed to the right eye are designated 426. The Fourier transform element 406 may be implemented as any of the Fourier transform elements disclosed herein and include, for example, one or more telecentric lenses. Light rays that pass through the reflector 402 are designated 428, 429, which correspond to light rays 420, 422, respectively.

In order to change the location where objects are displayed by the display 412, a first position shifting system 430 may be connected to the projector 404. The first position shifting system 430 may move the projector 404 and/or the display 412 towards or away from the Fourier transform element 406. This movement is referred to by arrow 431. In order to adjust the location of the Fourier transform element 406, a second position shifting system 432 may be connected to the Fourier transform element 406. The second position shifting system 432 moves the Fourier transform element 406 relative to the display 412 and/or the reflector 402. This movement is referred to by arrow 434 and changes how angular dispersion of light rays reach the eyes of a viewer. The Fourier transform element 406 may be moved based on knowledge of where objects are located relative to each other in an image. The positioning distance of the Fourier transform element 406 from the display 412 and from the reflector 402 can be adjusted giving the observer an effect of depth by changing the convergence/divergence of the light rays out of the Fourier transform element 406.

Although not shown in FIG. 4, the Fourier transform element 406 may include a variable optic with an adjustable focal length. For example, the Fourier transform element 406 may include a focus tunable lens (e.g., a liquid lens) and the control module 410 may adjust the focal length of the focus tunable lens by adjusting an applied voltage to the focus tunable lens. An example of this is shown in FIG. 5.

In an embodiment, the display 412 may include small point sources that are collimated to 3 degrees or less. In an embodiment, the display 412 includes a RGB VCSEL array where each pixel is one of three colors, red, green and blue whose near collimated illumination beams lends to the collection of a large focal length optic designed in a telecentric configuration. In another embodiment, the display 412 is a LED display that includes closely packed LEDs or micro-LEDs. In an embodiment, a lens array is included in the display 412 to collimate the light source(s). Other display types may be used as long as an optic and/or lens array are included that collimate the viewing angle of the light generated by the display 412.

The position shifting systems 430, 432 may receive power from a power source 440 or from the control module 410. The control module 410 controls operation of the position shifting systems 430, 432. The position shifting systems 430, 432 may include rails, motors, linkages, support brackets, etc. for supporting and moving the projector 404, the display 412, and/or the Fourier transform element 406.

FIG. 5 shows a physical representative view of another virtual imaging system 500 having a telecentric arrangement and including eye tracking and use of a reflector 502. The virtual imaging system 500 includes a projector 504, a Fourier transform element 506, the reflector 502, an eye tracking device 508, a control module 510 and a power source 512. The projector 504 may be configured similarly as the projector 404 of FIG. 4 and includes the display 412. The Fourier transform element 506 may be configured as any of the Fourier transform elements disclosed herein and may include one or more telecentric lenses and/or a focus tunable and/or variable liquid lens. In the example shown, the Fourier transform element 506 is implemented as a focus tunable lens that receives an applied voltage from the control module 510 based on power from the power source 512. Adjusting the focal length of the Fourier transform element 506 can change position of a displayed object to be perceived as being displayed closer or further away. Although not shown in FIG. 5, the virtual imaging system 500 may include position shifting systems, such as the position shifting systems 430, 432 of FIG. 4.

The Fourier transform element 506 is disposed between the projector 504 and the reflector 502 and receives light rays 511 and outputs light rays 512. A portion of the light rays 512 is reflected to eyes of a viewer 514. In an embodiment, the reflector 502 is at least partially transparent (or transmissive) such that a portion of the light rays 512 is reflected to the viewer and another portion of the light rays passes through the reflector 502. The eye tracking device 508 is included and tracks the eyes of the viewer 514. The FOV of the eye tracking device (e.g., a camera) is designated 520. The viewer 514 looks at the reflector 502 to see a virtual image that is perceived as being located in an area on an opposite side of the reflector 502 than the viewer 514. The viewer 514 looks through the reflector 502 (e.g., a window or a windshield). The viewing direction of the viewer 514 is represented by arrow 530.

In an embodiment, the Fourier transform element 506 which may include and/or be implemented as a focus tunable lens. The focus tunable lens is a shape-changing lens that changes shape based on a combination of optical fluids and a polymer membrane of the lens. A core element of the lens may include a container that is filled with an optical liquid and sealed off with a thin, elastic polymer membrane. A circular ring pushes onto a center of the membrane and shapes the tunable lens. The deflection of the membrane and with that the radius of the lens can be changed by pushing the ring towards the membrane by exerting a pressure to the outer part of the membrane or by pumping liquid into or out of the container.

Figure 6:
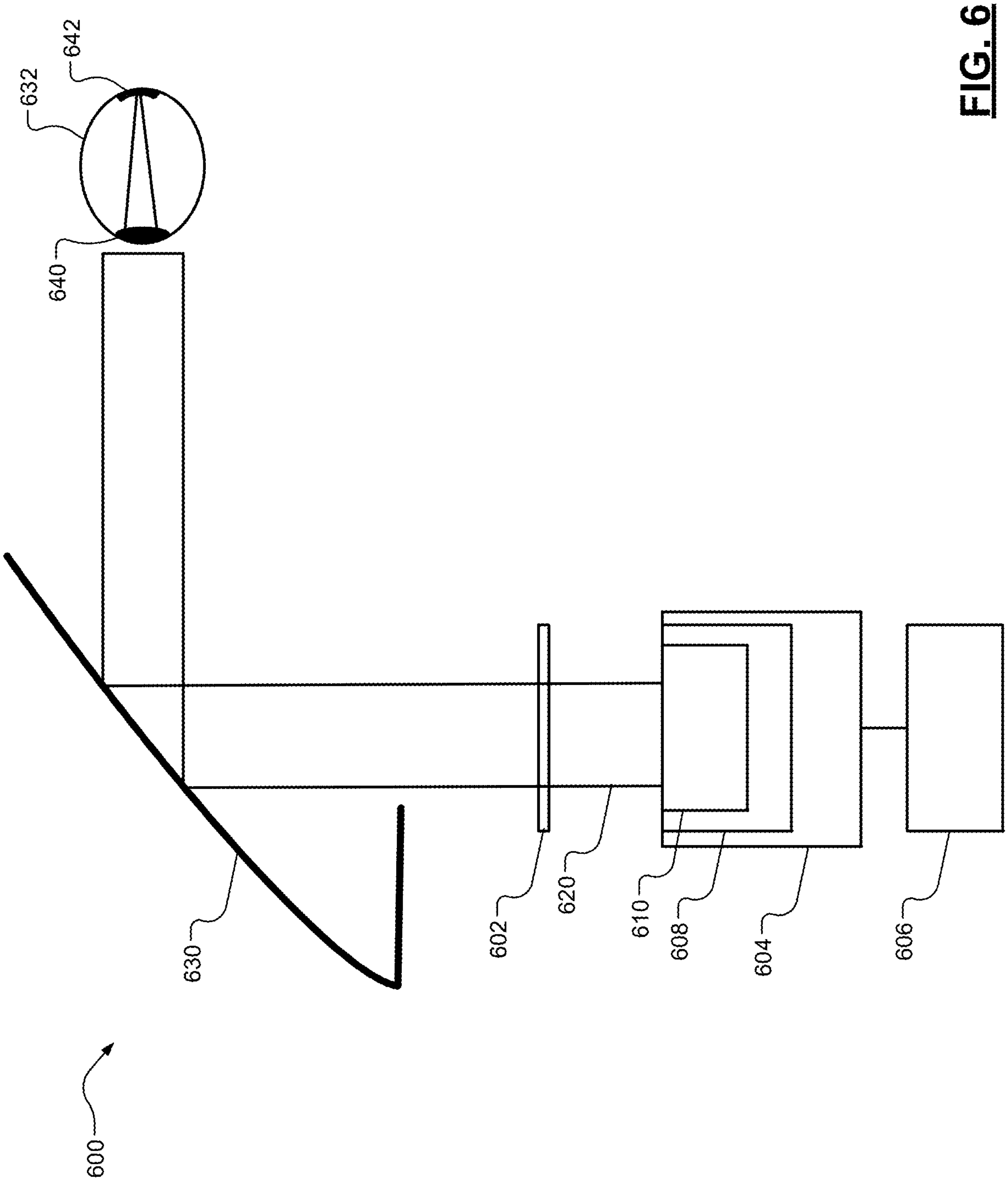
FIG. 6 is a function block diagram of an example virtual head up display system having another telecentric arrangement in accordance with the present disclosure.

FIG. 6 shows a virtual head up display system 600 that includes a Fourier transform element 602 (e.g., one or more telecentric lenses and/or a focus tunable lens), a projector 604 and a control module 606. The projector 604 may include a display 608 having an array of light emitting devices 610. The array may be a RGB VCSEL array, a LED array or other array and lens assembly providing a collimated beam of light 620. The collimated beam of light 620 is directed through the Fourier transform element 602 at a windshield 630 and is reflected at eyes of a viewer (one eye 632 is shown). The location of the Fourier transform element 602 may be a focal length of the Fourier transform element 602 from the array of light emitting devices 610. The Fourier transform element 602 may be i) at a first location, which is a focal length $f_L$ of the Fourier transform element 602 from the eyes of the viewer, ii) at a second location, which is a sum of the focal length $f_L$ of the Fourier transform element 602 and a focal length $f_e$ of the eyes of the viewer away from the eyes of the viewer, or iii) at a third location, which is between the first location and the second location. The eyes include lenses (e.g., lens 640) and retinas (e.g., retina 642).

The Fourier transform element 602, the projector 604, and/or the display 608 may be moved via a position shifting system, as described above.

Figure 7:
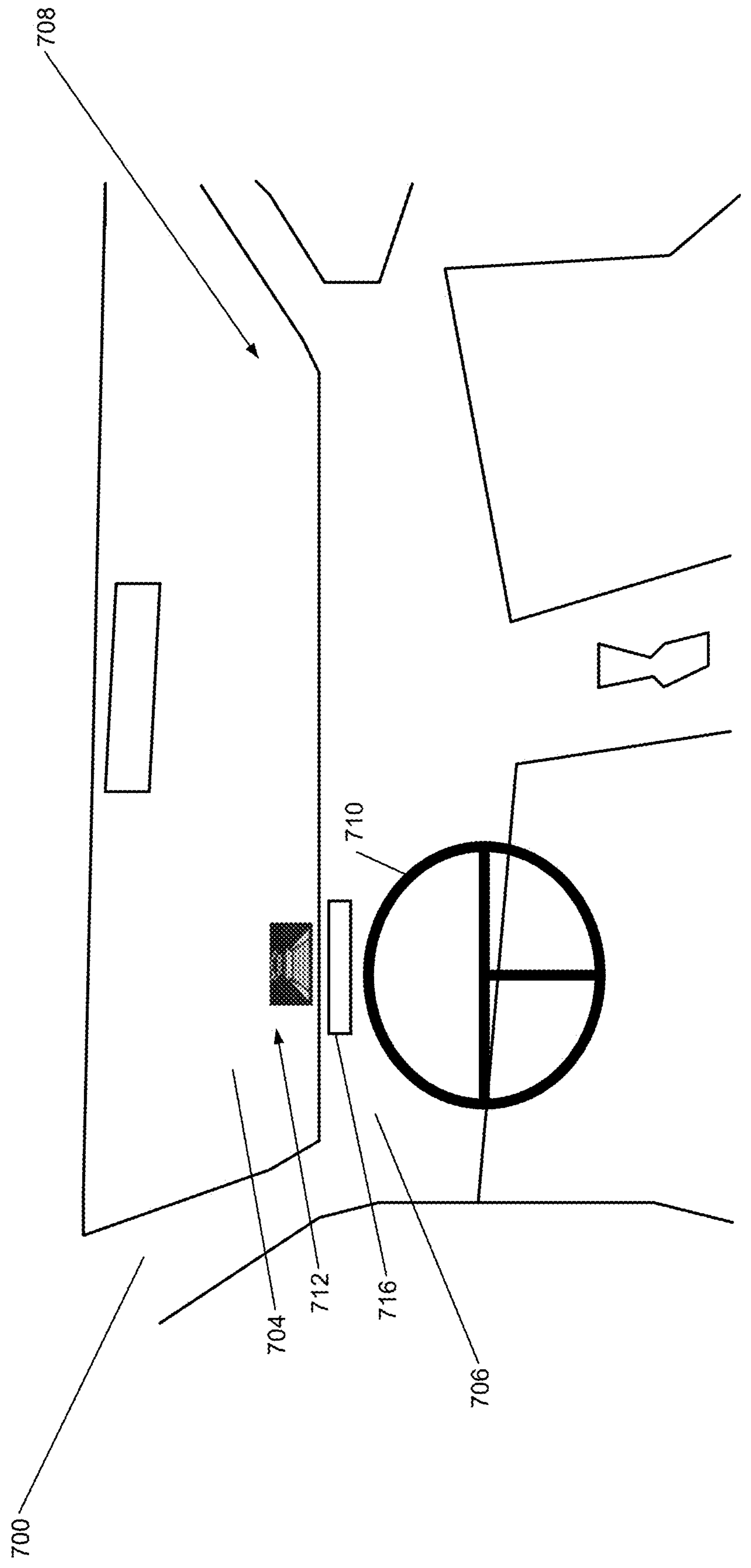
FIG. 7 is a perspective view of an example interior of a vehicle including a HUD including a telecentric lens arrangement in accordance with the present disclosure.

FIG. 7 shows an example perspective view from a driver seat of a vehicle 700. The vehicle 700 includes a windshield 704 located in a front opening of the vehicle 700. Passengers within a passenger cabin 708 of the vehicle 700 can look through the windshield 704 to see in front of the vehicle 700. While the example of a land-based vehicle is described, the present application is also applicable to air-based vehicles (e.g., airplanes, helicopters, etc.) and water-based vehicles (e.g., boats, etc.). Also, although some examples are disclosed herein with respect to vehicle implementations, the examples are applicable to non-vehicle implementations.

As shown in FIG. 7, the windshield 704 is visually located above a dashboard 706 of the vehicle 700. The vehicle 700 may include a steering wheel 710. The vehicle 700 may be an autonomous vehicle, a semi-autonomous vehicle, or a non-autonomous vehicle. A HUD system, such as that described above with respect to FIG. 6, projects a virtual image 712 shown in FIG. 7 onto a portion of the windshield 704 through an aperture 716 in the dashboard 706. The virtual image 712 includes various vehicle information, such as a present speed of the vehicle 700, a present gear of a transmission of the vehicle 700, an engine speed, a directional heading of the vehicle 700, present infotainment system settings, and/or other vehicle information. The virtual image 712 presents data to the driver of the vehicle without the driver having to look away from objects in front of the vehicle. As discussed further below, the virtual image 712 includes different color overlapping images that are the same size and spatially aligned to provide a single image seen by the viewer as described herein.

Figure 8:
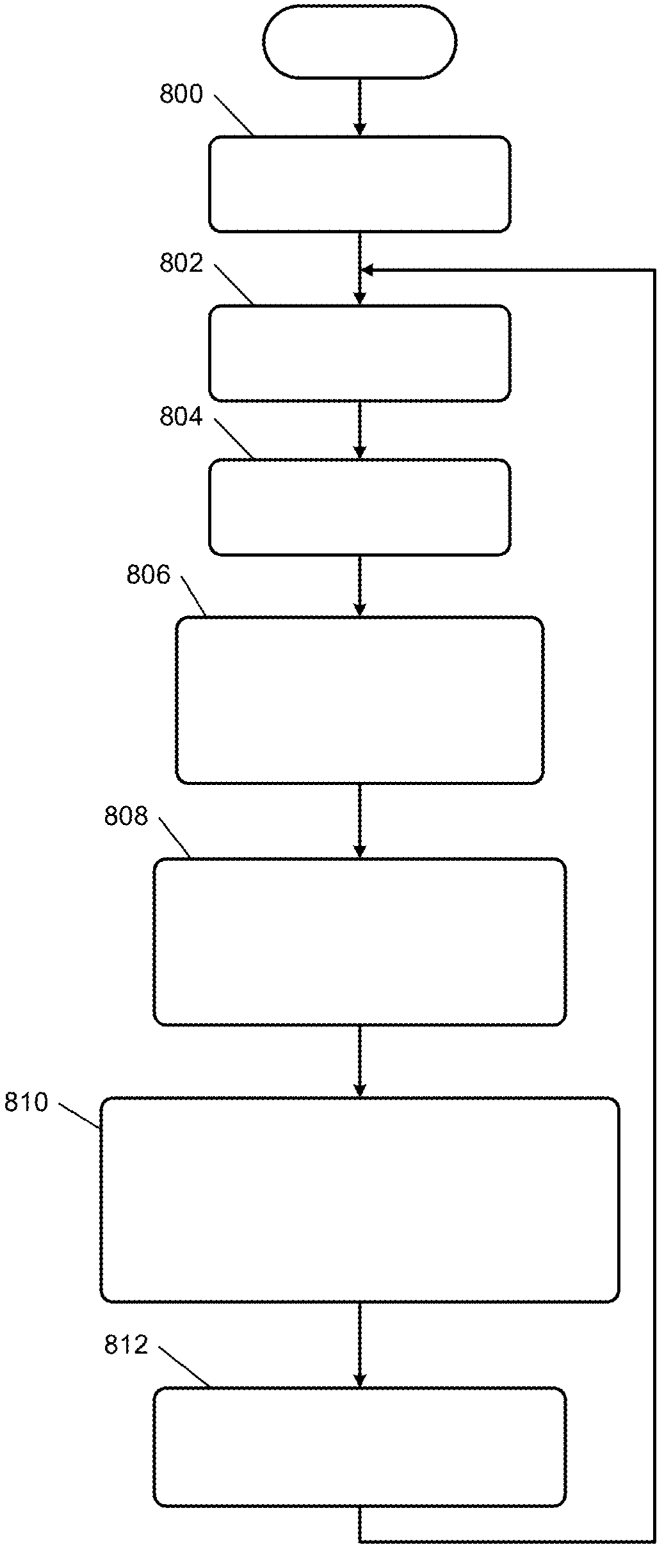
FIG. 8 illustrates a virtual imaging method including displaying different object data in different regions of a display for left and right eyes of an individual observer based on the eye tracking in accordance with the present disclosure.

FIG. 8 shows a virtual imaging method including displaying different object data in different regions of a display for left and right eyes of an individual based on the eye tracking. The following operations may be iteratively performed. The following operations may be performed by one of the control module disclosed herein.

At 800, the control module controls operation of an eye tracking device to track eyes of a viewer. At 802, the control module estimates, based on output of the eye tracking device, a head pose of the viewer. At 804, the control module, based on the output of the eye tracking device, estimates gaze angles of each eye of the viewer.

At 806, the control module maps and correlates the head pose information and the gaze angles to one or more locations and/or regions on a reflector and/or one or more corresponding locations and/or regions on a display of a projector. When looking at the reflector through a Fourier transform element as described herein, the viewer is looking at a reflection of the display. The viewer's left eye may be looking at a different portion or region of the display than the user's right eye. The viewing angle of each eye is mapped to a different region upon the projector display (or object display screen).

At 808, the control module, based on the determined one or more locations and/or regions looked at by the viewer, determines image data to be displayed in the one or more locations and/or regions. Different views, objects, portions of one or more objects, etc. may be displayed and seen by different eyes of the viewer. The objects and portions thereof may be independently selected for the different locations and regions. The objects and virtual images displayed may include vehicle status information, infotainment information, map information, information regarding an environment of the corresponding vehicle, etc.

At 810, the control module, based on the determined one or more locations looked at by the viewer, displays selected image data in the one or more locations via the projector display and Fourier transform element including one or more telecentric lenses.

At 812, the control module via the eye tracking device detects a change in the head pose of the viewer and/or a change in gaze angles of the one or more eyes of the viewer and returns to operation 800.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A virtual imaging system comprising:
- a projection display configured to display at least one object;
- a Fourier transform element comprising at least one telecentric lens and configured to Fourier transform the at least one object to generate at least one converted object, the at least one converted object being reverse Fourier transform converted by lenses of eyes of a viewer to a virtual image seen by retinas of the viewer;
- at least one position shifting system coupled to and configured to move at least one of the projection display and the Fourier transform element; and
- a control module configured to
  - control operation of the projection display to display the at least one object and, via the Fourier transform element, project the virtual image seen by the viewer; and
  - control the at least one position shifting system to adjust a distance between the projection display and the Fourier transform element.

2. The virtual imaging system of claim 1, wherein the Fourier transform element is located at a focal length of the at least one telecentric lens from the projection display.

3. The virtual imaging system of claim 1, further comprising a position shifting system configured to move the projection display relative to the Fourier transform element,
- wherein the control module is configured to control the position shifting system to adjust a distance between the projection display and the Fourier transform element.

4. The virtual imaging system of claim 1, further comprising a position shifting system configured to move the Fourier transform element relative to the projection display,
- wherein the control module is configured to control the position shifting system to adjust a distance between the projection display and the Fourier transform element.

5. The virtual imaging system of claim 1, wherein the Fourier transform element is i) at a first location, which is a focal length $f_L$ of the Fourier transform element from the eyes of the viewer, ii) at a second location, which is a sum of the focal length $f_L$ of the Fourier transform element and a focal length $f_e$ of the eyes of the viewer away from the eyes of the viewer, or iii) at a third location, which is between the first location and the second location.

6. The virtual imaging system of claim 1, further comprising a reflector disposed between the Fourier transform element and the viewer, wherein the reflector is semi-transmissive and semi-reflective.

7. A virtual imaging system comprising;

a projection display configured to display at least one object;

a Fourier transform element comprising at least one telecentric lens and configured to Fourier transform the at least one object to generate at least one converted object, the at least one converted object being reverse Fourier transform converted by lenses of eyes of a viewer to a virtual image seen by retinas of the viewer;

a control module configured to control operation of the projection display to display the at least one object and, via the Fourier transform element, project the virtual image seen by the viewer;

a reflector disposed between the Fourier transform element and the viewer, wherein the reflector is semi-transmissive and semi-reflective; and a position shifting system configured to move the Fourier transform element relative to the reflector, wherein the control module is configured to control the position shifting system to adjust a distance between the Fourier transform element and the reflector.

8. The virtual imaging system of claim 6, wherein:

the Fourier transform element consists of the at least one telecentric lens;

no intermediary devices are disposed between the projection display and the at least one telecentric lens; and no intermediary devices are disposed between the Fourier transform element and the reflector.

9. The virtual imaging system of claim 1, wherein the Fourier transform element comprises a focus tunable lens, wherein the control module is configured to control a voltage applied to the focus tunable lens to adjust a focal length of the focus tunable lens.

10. The virtual imaging system of claim 9, further comprising at least one position shifting system coupled to and configured to move at least one of the projection display and the Fourier transform element, wherein the control module is configured to adjust an apparent location of the virtual image and distance of the virtual image from the viewer by varying a distance of the at least one object from the at least one telecentric lens via the position shifting system.

11. The virtual imaging system of claim 1, further comprising at least one eye tracking device configured to track the eyes of the viewer, wherein the control module is configured to determine a head pose and gaze angles of the eyes of the viewer based on an output of the at least one eye tracking device, and, based on the head pose and the gaze angles, to display a first selected one or more objects in a first region of the projection display to be viewed by a left eye of the viewer, and to display a second selected one or more objects in a second region of the projection display to be viewed by a right eye of the viewer.

12. The virtual imaging system of claim 11, wherein the control module is configured to convert the head pose and the gaze angles of the eyes to position coordinate locations on the projection display.

13. The virtual imaging system of claim 11, wherein the control module is configured to display different object data in a first region of the projection display than in a second region of the projection display.

14. The virtual imaging system of claim 1, further comprising at least one eye tracking device configured to track the eyes of the viewer, wherein the control module is configured to determine a head pose and gaze angles of the eyes of the viewer based on an output of the at least one eye tracking device, and, based on the head pose and the gaze angles, to display a first portion of a selected object via a first region of the projection display and a second portion of the selected object via a second region of the projection display to display a virtual three-dimensional image.

15. The virtual imaging system of claim 1, wherein the projection display comprises an array of light emitting devices and is configured to produce a collimated light beam directed at the Fourier transform element.

16. The virtual imaging system of claim 1, wherein the projection display, the Fourier transform element and the control module provide uniform magnification across the virtual image.

17. A virtual image projection method comprising:

displaying at least one object via a projection display;

Fourier transforming the at least one object via at least one telecentric lens of a Fourier transform element disposed downstream from the projection display to generate at least one converted object, the at least one converted object being reverse Fourier transform converted by lenses of eyes of a viewer to a virtual image seen by retinas of the viewer;

moving via a position shifting system at least one of the projection display and the Fourier transform element;

controlling operation of the projection display via a control module to display the at least one object and, via the Fourier transform element, project the virtual image seen by the viewer; and controlling the position shifting system to adjust a distance between the at least one projection display and the Fourier transform element.

18. The virtual image projection method of claim 17, further comprising:

disposing a reflector between the Fourier transform element and the viewer, wherein the reflector is semi-transmissive and semi-reflective;

moving the Fourier transform element relative to the reflector via a position shifting system; and controlling the position shifting system via the control module to adjust a distance between the Fourier transform element and the reflector.

19. The virtual image projection method of claim 17, further comprising:

controlling a voltage applied to a focus tunable lens of the Fourier transform element via the control module to adjust a focal length of the focus tunable lens; and moving at least one of the projection display and the Fourier transform element to adjust a distance between the projection display and the Fourier transform element.

20. The virtual image projection method of claim 17, further comprising:

tracking eyes of the viewer to determine a head pose and gaze angles of the eyes of the viewer;

converting the head pose and the gaze angles of the eyes to position coordinate locations on the projection display; and based on the position coordinate locations, displaying a first selected one or more objects in a first region of the projection display to be viewed by a left eye of the viewer, and displaying a second selected one or more objects in a second region of the projection display to be viewed by a right eye of the viewer.

* * * * *